United States Patent
Spicer et al.

[15] 3,700,365
[45] Oct. 24, 1972

[54] APPARATUS FOR CONTINUOUSLY VULCANIZING ENDLESS BELTS

[72] Inventors: Alvin W. Spicer, Cuyahoga Falls; Anselm Talalay, Cleveland, both of Ohio

[73] Assignee: The B. F. Goodrich Company, New York, N.Y.

[22] Filed: Sept. 21, 1970

[21] Appl. No.: 73,731

[52] U.S. Cl. .................... 425/28, 425/384, 425/373
[51] Int. Cl. ............................................ B29h 7/22
[58] Field of Search .......... 18/38, 2 R, 17 B, 6 E, 4 B, 18/5 A, 6 V, 9, 26 RR, 20 R; 264/165; 156/137–140; 74/242.8, 242.9

[56] References Cited

UNITED STATES PATENTS

| 3,152,204 | 10/1964 | Sauer ...................... 18/6 E X |
| 2,093,922 | 9/1937 | Meyer ......................... 18/6 E |
| 2,110,076 | 3/1938 | Bierer ......................... 18/6 E |
| 3,477,895 | 11/1969 | Sauer ...................... 18/6 E X |
| 3,495,297 | 2/1970 | Nagato ......................... 18/6 E |

Primary Examiner—Robert L. Spicer, Jr.
Attorney—W. A. Shira, Jr. and Joseph J. Januszkiewicz

[57] ABSTRACT

A machine for simultaneously curing a plurality of elastomeric belts while passing over a heated rotary drum. The belts are individually uniformly tensioned by individually movable tension idlers each actuated by a separate fluid pressure actuated cylinder connected to a common source of predetermined fluid pressure. A separate endless metal band is provided for individually pressing each of the belts against the drum with the bands each passing over an individual movable tension idler similar to that used for the belts for maintaining each of the bands at a predetermined uniform tension.

21 Claims, 9 Drawing Figures

INVENTORS
ALVIN W. SPICER
ANSELM TALALAY
BY W. A. Shira, Jr.
ATTY.

INVENTORS
ALVIN W. SPICER
ANSELM TALALAY
BY
ATTY.

INVENTORS
ALVIN W. SPICER
ANSELM TALALAY
BY
W. A. Shira Jr
ATTY.

APPARATUS FOR CONTINUOUSLY VULCANIZING ENDLESS BELTS

BACKGROUND OF THE INVENTION

Vulcanization of large endless belts, formed of elastomeric material with cord reinforcement has commonly been performed by sequential segmental cure in a stationary vulcanizing press or mold. From time to time, attempts have been made to provide means a drum. continuously curing such belts while rotating over a drum. It has been thought desirable to continuously cure belts in this manner in order to provide a uniform vulcanization of the belt throughout its entire length. When a belt is cured in portions in a stationary mold or press, areas of non-uniform curing are formed in the regions of the belt that extend from the edges of the mold or press at each curing stage. This is the result of advancing the belt after each curing cycle a distance less than the extent of the mold surface so that segments of the belt adjacent the edges of the mold are subjected to the vulcanization cycle more than once and hence may be overcured.

Furthermore, it is quite difficult to fabricate an uncured elastomeric belt having uniform mass density per unit length; and, if identical mechanical pressure and heat are applied to all portions of the length of the belt in a mold having a cavity of fixed physical dimensions, variations in the mass of the belt result in the mold or press providing different curing conditions for different portions of the belt. Thus, a thick, or large, cross section of the belt would be subjected to a higher pressure by a fixed cavity mold or press and a thinner or smaller cross section portion of the belt would be subjected to lesser mechanical pressure. If the cross section of the belt is sufficiently small, it is possible that the belt will be vulcanized at an insufficient pressure in the mold, or press cavity, to provide proper control of cured belt volume. Thus, it has been thought for some time that belt quality would be improved by a more uniform application of heat and pressure during cure.

Various types of apparatus have been previously proposed for simultaneously continuously curing a plurality of endless belts under tension over a rotary drum. However, these devices have usually relied for application of tension to the belts upon a movable idler pulley having a plurality of spaced co-axial grooves which rotate about a common pulley axis. Thus, a plurality of belts could be cured simultaneously on a single heated drum by urging the tension idler pulley into contact with the inner periphery of the belts and stretching the belts as they passed over the drum. This technique, however, does not solve the fundamental problem of providing a means for curing the plurality of belts while each belt is subjected to a common uniform tension during the vulcanization of its entire length. Thus, when a single axis multiple-groove idler pulley is tensioned against the plurality of belts orbiting over a common curing drum during vulcanization, variations in length of the belts result in the shorter belts being subjected to a greater tension than the longer belts for a given distance of the tension pulley from the center of the curing drum.

It has been also heretofore proposed to provide a pressure applying and heat insulating shoe or a single travelling band to press against the outer periphery of the belts as they pass over the curing drum in order to provide the source of mechanical pressure on the belts while each belt is in contact with the curing drum. However, this is analogous to the situation of curing the belt in segments in a stationary mold or press having a cavity of fixed physical dimensions. This is because variations in the thickness of the axially adjacent belts will cause the radially thicker belts to be contacted by the pressure shoe or band before adjacent belts of lesser radial height are contacted. Thus, the thicker belts will receive greater mechanical pressure while in contact with the curing drum and the radially thinner belts will receive a lesser mechanical pressure. Hence, the radially thinner belts may receive insufficient mechanical pressure to provide for proper consolidation of the belt components to effect uniform adhesion thereof and uniform shaping of the belt.

SUMMARY OF THE PRESENT INVENTION

The present invention provides a solution to the above-described problems of curing simultaneously a plurality of endless elastomeric belts. This is accomplished by passing the plurality of belts simultaneously over a heated rotary drum while each belt is individually tensioned to a uniform tension and is subjected individually to a uniform mechanical pressure. The individual tensioning of the belts is effected by a plurality of tension idlers with each idler contacting, respectively, the inner periphery of one of the belts to be cured. The tension idlers are individually radially moved by power cylinders, all of which are connected to a common source of predetermined fluid pressure. While each belt is in contact with the heated curing drum, the outer periphery of the belt is contacted by an orbiting endless band of inextensible material, there being a separate band for each belt. Each of the bands also has a tension idler which is individually radially movable. Preferably, the tension idler for each band is radially movable by a power cylinder with the power cylinders all being connected to a common source of predetermined fluid pressure thereby providing a uniform common tension in all the bands.

Thus, each belt is individually subjected to a uniform and common tension as it orbits over the curing drum and is further individually subjected to a uniform and common mechanical curing pressure while it is in contact with the drum.

DETAILED DESCRIPTION

Figure 1:
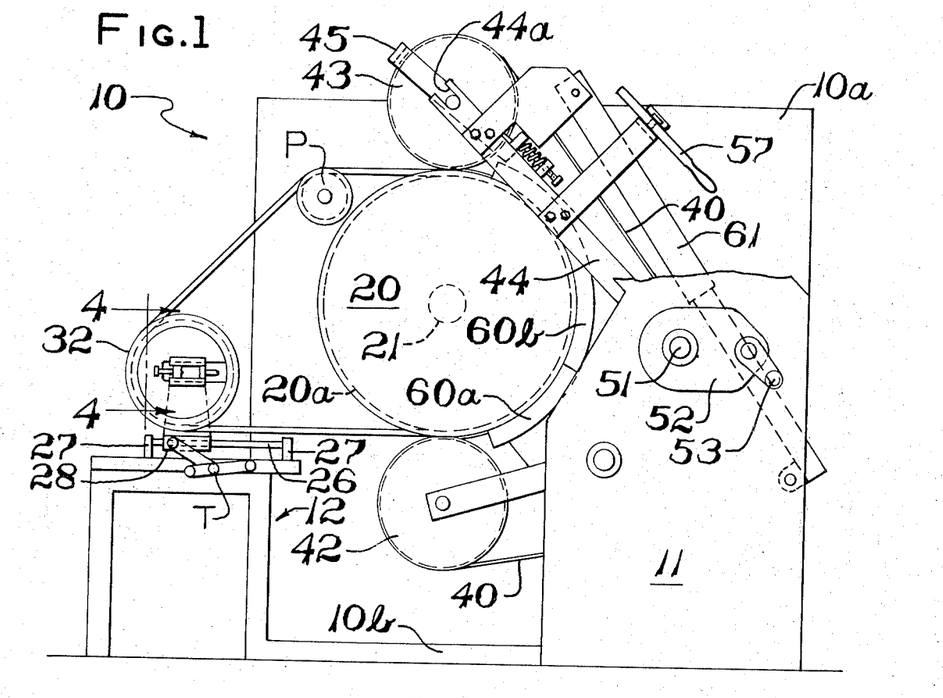
FIG. 1 is a semi-schematic side elevation view of a rotary, endless belt curing machine embodying this invention and showing the belts as they orbit over the curing drum and the idler pulleys.
Figure 2:
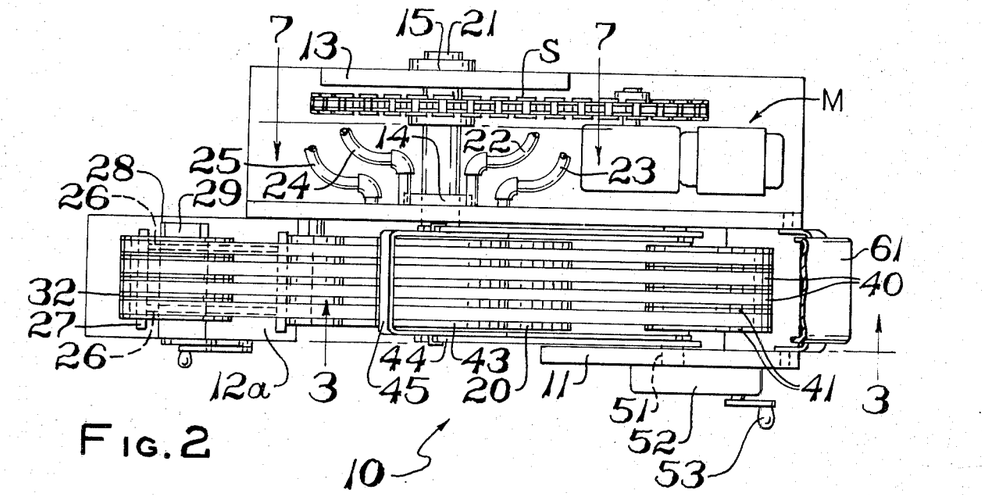
FIG. 2 is a plan view of the machine of FIG. 1.

Referring now to FIG. 1 and FIG. 2, the presently preferred machine is mounted on suitable frame here shown as having a base 10 which comprises a rigid vertical plate 10a and a horizontal support plate 10b. A front support plate 11, the upper portion of which has been omitted for clarity in FIG. 1, is provided, spaced from the vertical plate 10a, and disposed parallel thereto. A frame 12, attached to the vertical plate 10a of base 10, serves to support the tension idler pulleys for tensioning the belts to be cured. A rear plate 13 extends vertically from the horizontal plate 10b of base 10, the rear plate 13 being arranged parallel to the vertical plate 10a.

A pair of shaft-receiving bearings 14, 15 is provided in axially spaced arrangement, respectively, one on the rear plate 13 and one on vertical plate 10a. A shaft 21 is received through each of bearings and is free to rotate therein. A curing drum 20 is mounted on that end of the shaft 21 which extends through the vertical plate 10a of the base 10 so that the drum is in cantilevered arrangement from vertical plate 10a with its axis of rotation parallel to the horizontal plate 10b of base 10. Hence, the drum 20 rotates in a vertical plane. This arrangement has been found convenient to provide ready access to the belts, but it is to be understood that the drum may be arranged to rotate in a horizontal plane or in any convenient orientation with respect to the vertical plate 10a of the base 10. The drum 20 has a plurality of axially spaced concentric grooves 20a formed therein for individually receiving the belts to be cured as they pass over the drum, with the grooves being shaped so as to serve as a mold for the inner periphery and the sides of the belts.

Referring now to FIG. 2, a chain drive, denoted by S incorporating a sprocket and chain is provided on shaft 21 for rotating the drum 20 continuously. A motor and driving sprocket assembly M are mounted on the horizontal plate 10b and engage the driving chain for transmitting driving power thereto. A pair of steam lines 22, 23, connected via a rotary fitting (not shown in FIG. 2), is provided in the vertical plate 10a opposite the drum for introducing steam therein under pressure. A second pair of fluid transfer lines 24 and 25 is also provided and interconnected via a rotary fitting (not shown in FIG. 2) to the drum 20 for communicating fluid therethrough for zone cooling portions of the drum as will be hereinafter described in detail.

A pair of spaced parallel guide rods 26, having mounting blocks 27 respectively attached to the ends thereof, is mounted on a horizontal deck plate 12a provided on frame 12. A sub-frame 28 is received on the rods and is free to slide thereon. A toggle mechanism T is provided interconnecting the sub-frame 28 and the deck plate 12a of the frame 12 such that the sub-frame may be locked in position or quickly released to slide along the rods. The rods 26 are disposed with the longitudinal direction of the rods parallel with the grooves 20a in the drum. Thus, the sub-frame slides toward or away from the curing drum by action of the toggle T.

Figure 4:
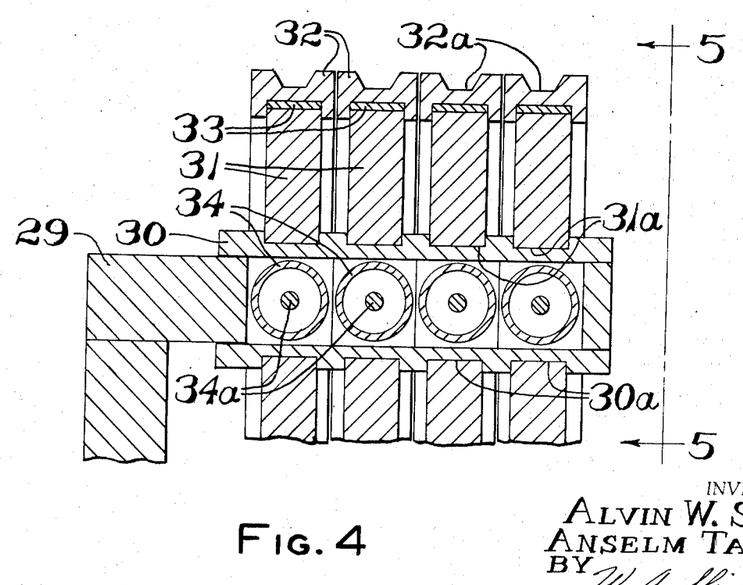
FIG. 4 is a portion of a section, drawn to an enlarged scale, taken along section indicating lines 4—4 of FIG. 1, and shows the details of the individually movable idlers for tensioning the belts.
Figure 5:
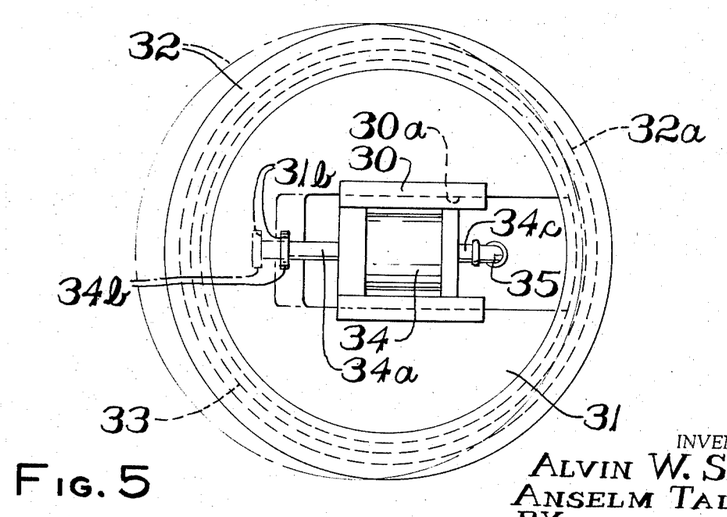
FIG. 5 is a portion of a sectional view, to an enlarged scale, taken along section indicating lines 5—5 of FIG. 4, and shows further details of the tension idler pulleys.

Referring now to FIGS. 4 and 5, a slide block assembly 29 is securely fastened to the sub-frame 28 so as to move therewith along the rods 26. A slide guide 30 is rigidly attached to the slide block assembly 29 so as to extend in horizontal cantilevered arrangement therefrom. The guide 30 has a plurality of spaced parallel grooves 30a formed therein, with each of the grooves being respectively aligned with one of the grooves in the rotating curing drum. A plurality of discs 31, each having a slot with parallel sides 31a formed therein, are received respectively, one in each of the grooves 30a, such that the discs are disposed in spaced parallel arrangement extending vertically of the slide block assembly 29, and slide freely in a horizontal direction in groove 30a. Each disc has a sleeve bearing 33 disposed about the outer periphery thereof with a pulley ring 32 received thereover such that the ring is free to rotate about the disc. A sleeve bearing is illustrated in FIG. 4, but it will be understood that any bearing arrangement may be used as, for example, a ball or roller bearing assembly. Each of the rings 32 has a belt receiving groove 32a formed in the outer periphery thereof which groove has received therein one of the belts to be cured. In operation, when each disc 31 is slidably moved in the grooves 30a, the pulley ring carried thereby is urged radially into contact with the inner periphery of one of the belts to be cured.

A power cylinder 34, is provided for each disc and is attached to the slide guide 30. Each cylinder has a piston rod 34a extending therefrom and each rod has an end fitting 34b. A second slot 31b is provided, respectively, in each of the discs 31 with one of the rod fittings 34b received in each of the said second slots 31b. The slot 31b is closely spaced adjacent the closed end of slot 31a. Each of the power cylinders 34 has a fluid pressure port 34c provided thereon, the ports 34c on each cylinder being connected to a common pressure manifold 35 for simultaneous introduction of a predetermined fluid pressure into the power cylinders 34.

In operation, fluid pressure is introduced into the pressure manifold 35, and consequently into each of the power cylinders 34, causing the piston rods 34a to extend, thus urging the discs 31 slidably along the grooves 30a such that the pulley rings 32 contact, individually, the belts to be cured. Referring now specifically to FIG. 5, the relaxed, or unpressurized, position of the discs and pulleys is shown in solid outline with the pressurized, or belt tensioning, position being shown in phantom outline. It should be noted that when fluid pressure is introduced and maintained in manifold 35, movement of each of the discs 31 on the slide 30, due to the force of the fluid pressure acting in the respective power cylinders attached to that particular disc is resisted by the tension in the belt contacted by the ring mounted on the disc. Thus, if constant pressure is maintained in manifold 35, the several discs on the slide will individually move until the force applied by each power cylinder is balanced by the tension force of the belt on the corresponding belt ring so that each belt is maintained under the same tension regardless of variations in belt length. In the presently preferred practice of the invention, fluid pressure for the cylinders is provided by a hydraulic pump (not shown).

In the presently preferred form of the invention, a stationary idler pulley P, FIG. 1 and FIG. 2, having a plurality of axially spaced concentric belt guiding grooves, is rotatably mounted on vertical plate 10a. The pulley P is preferably positioned so as to maintain the belts in a horizontal arrangement as they leave the drum grooves.

Figure 3:
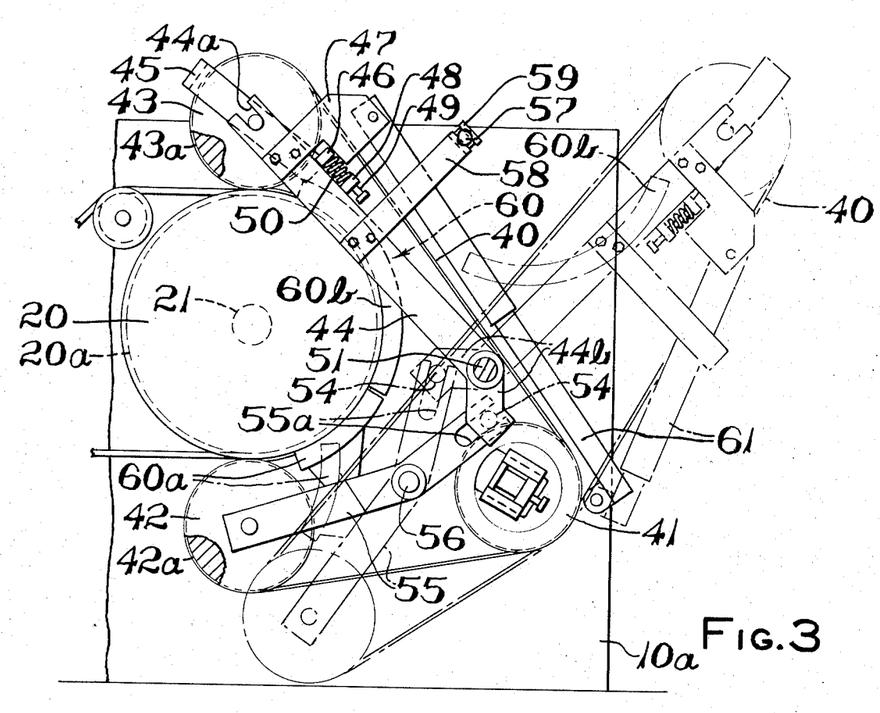
FIG. 3 is a section, taken along section indicating line 3—3 of FIG. 2, and shows the details of the band tensioning mechanism, which is illustrated in solid line in its tensioned state and in phantom outline in the open, or released state.
Figure 3A:
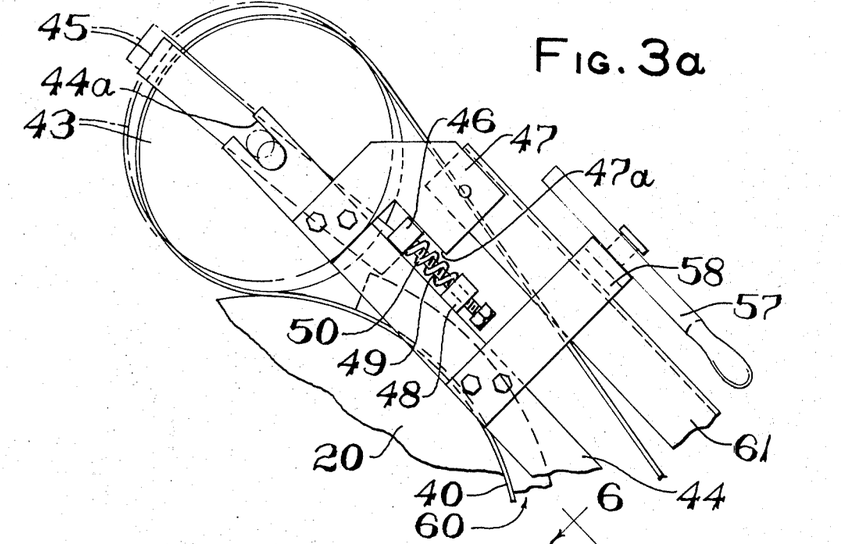
FIG. 3a is an enlarged view of the upper portion of FIG. 3.

Referring now to FIG. 2, 3 and 3a, a plurality of endless bands 40 of substantially inextensible material, preferably metal, is provided with the bands each respectively passing over one of the individual tension idler pulleys 41 and and over a pair of spaced idler pulleys 42 and 43 each of which has a plurality of concentric axially spaced grooves 42a and 43a respectively formed thereon. The individual tension idler pulleys 41 are similar in construction and the manner in which they are slidably mounted to those provided for tensioning the belts. Thus, each of the tension idler pulleys 41 is rotatably mounted upon a slidable but not rotatable disc that has a power cylinder attached thereto, similar to those illustrated in FIGS. 4 and 5 for the belt tension idlers, for maintaining the individual pulleys at a constant tension force against, respectively, each of the bands 40. Each of the bands 40 thus orbits over the tension idler pulleys 41 and the pair of spaced idler pulleys 42 and 43, with the outer periphery of each band contacting respectively one of the belts as it passes over the drum 20. The pulleys 42 and 43 are disposed in closely spaced relationship to the outer periphery of the drum diametrically opposed of the drum when the pulleys are in the band tensioning position. In the presently preferred form of the apparatus, the pulleys 42 and 43 are, respectively, disposed vertically below and above the center of the drum. However, the choice of location of the idlers 42 and 43 is governed by the desired arcuate length of bands to be held in contact with the outer periphery of the belts as they pass over the drum 20. The tension idler pulleys 41 are disposed in spaced relationship from the drum vertically intermediate pulley 42 and the center of the drum. The tension idler pulleys 41 are each slidably mounted on a block assembly similar to that provided for the belt tension idler pulleys as mentioned above, which block assembly is rigidly attached to the vertical plate 10a and front plate 11 and disposed between the plates.

The upper idler pulley 43 is rotatably mounted on the upper ends of a pair of spaced parallel pivot arms 44 pivotably mounted intermediate the ends, by a common pivot 51, to the vertical plate 10a and front plate 11. The upper end of each of the two pivot arms 44 has a bifurcated portion 44a for receiving the pulley shaft therein.

The upper idler pulley 43 is rotated in a yoke 45, with each end of pulley shaft extending through the yoke 45 and with the ends of the shaft slidably received in the bifurcated portion 44a of, respectively, each one of the pivot arms 44. The yoke 45 is formed generally in "U"-shaped configuration with the open ends thereof extending toward the pivot portion of the arms 44 and with the spaced ends of the yoke being transversely connected by a bar 46 illustrated in FIGS. 2.

Referring to FIG. 3a, a pair of guide plates 47, each having a slot 47a formed therein, is attached, respectively, one each to the arms 44 with the slot 47a of each plate parallel to the upper longitudinal surface of the respective pivot arm 44. The bar 46, being disposed to slide longitudinally of the pivot arms thereof, is received in the slots 47a. Each of the arms 44 has a lug portion 48 extending therefrom with each lug portion longitudinally aligned with respect to an adjacent one of the slots 47a and having an aperture formed therein with a guide rod 49 received therethrough. The guide rods 49 each are free to slide in the lugs 48 in a direction parallel to the arms 44. Each of the guide rods 49 has a compression spring 50 received concentrically thereover which is compressed longitudinally between the lug 48 and the transverse bar 46.

In operation, the compression springs 50 urge the bar 46 and, hence, the yoke 45 away from the lugs 48 with the shaft for the tension idler pulleys 43 sliding in the bifurcated portions 44a in the direction away from the pivotal mounting of arms 44. The arrangement of the idler pulley 43, when the bands 40 are tensioned, is shown in solid lines in FIG. 3a and is shown in phantom outline for the condition when the bands 40 are not tensioned. In the open or untensioned position, the compression springs 50 maintain a residual tension on the bands to prevent excessive slack.

Referring now to FIG. 3, each of the arms 44 is mounted on pin 51 pivoted on the base in such a manner that the pulley 43, when moved to and from band tensioning position, subscribes an arc in a plane parallel to the vertical plate 10a. A gear drive 52, which is illustrated in FIGS. 1 and 2, engages a gear (not shown) attached to the pivot pin 51 for rotating the arms 44. The gear drive assembly 52 is mounted on the front plate 11 and is actuated by turning a crank 53 attached thereto. Pivot pin 51 passes through the vertical plate 10a and through the front plate 11, thereby forming a pivot axis for the pair of arms 44. Each of the arms 44 has a portion 44b extending from the pivot in generally opposite direction from the portion of the arm to which the pulley 43 is attached, which portions 44b each have a pivot pin 54 received therethrough. A pair of second pivot arms 55 are disposed in spaced parallel arrangement and are free to pivot on a pivot pin 56 extending through the arms intermediate the ends thereof which pin has its opposite ends connected respectively one to the vertical plate 10a and the other end to front plate 11. Each of the arms 55 has a bifurcated portion 55a formed on the upper end thereof adjacent the end 44b of arms 44. The pivot pin 54, connecting the ends 44a of arms 44, is received in the bifurcated portion 55a of each of the lower set of arms 55 such that pivotal motion of the upper pair of arms 44 causes pin 54 to slide in the bifurcated portion 55a thereby causing pivotal motion of the lower set of arms 55. The lower idler pulley 42 is rotatably mounted on the ends of arms 55 opposite the bifurcated end 55a, with the pulley 42 being disposed between the arms.

In operation, when the crank 53 is turned, the gear drive rotates a gear (not shown) attached to the pivot pin 51 and thus rotates arm 44 thereby causing the pin 54 to move in the bifurcated portion 55a of the arms 55 thus rotating arms 55 about pivot pins 56 and consequently the idler pulley 42 toward or away from drum 20. Referring again specifically to FIG. 3, the position of the pivot arms 44 and 55, respectively, and idler pulleys 43 and 42 is shown in solid outline where the pulleys are in closely spaced relationship with the drum. In the relaxed position, the pulleys are widely spaced from the drum as illustrated in FIG. 3 by the phantom outline.

Figures 1A, 6:
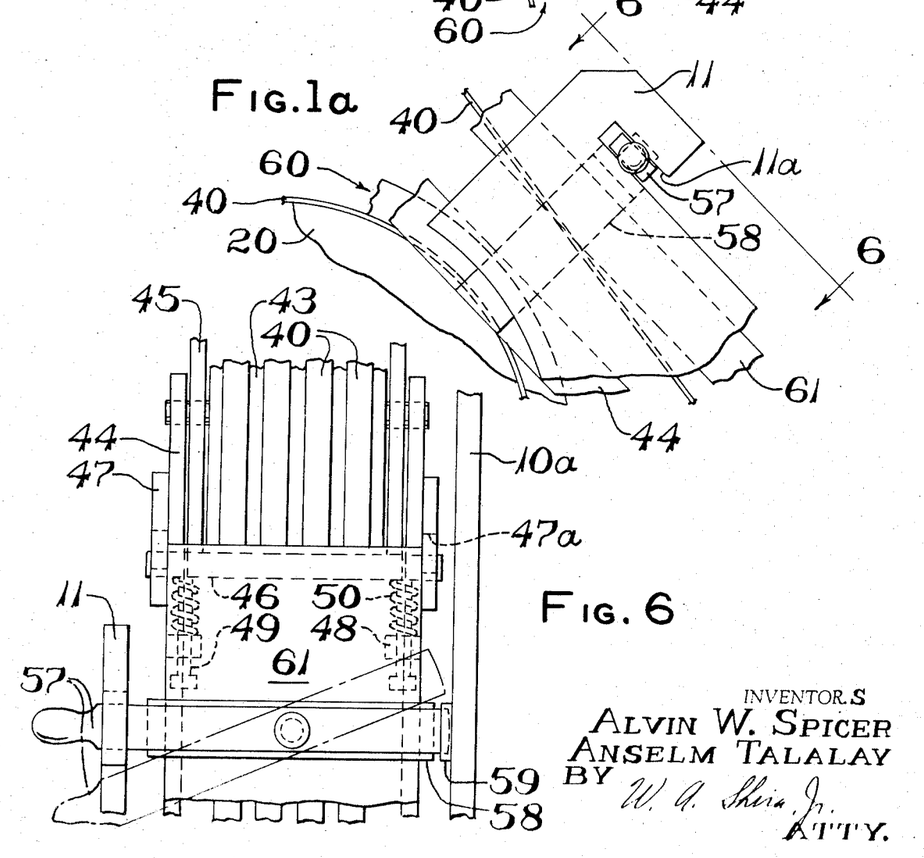
FIG. 1a is a side elevation, drawn to an enlarged scale, of the upper portion of the machine of FIG. 1 including the portions of the front plate omitted in FIG. 1.
FIG. 6 is a section view taken along section indicating lines 6—6 of FIG. 1a and shows in detail the tension band locking mechanism.

The endless bands 40, as previously mentioned, pass over the tension idler pulleys 41 and over the idler pulleys 42 and 43 in such a manner that when the arms 44 and 45 are moved, so as to urge idler pulleys 42 and 43 into position so as to be closely spaced from the drum, the endless bands 40 are tensioned over the drum with the outer periphery of the portion of each band between pulleys 42 and 43 contacting the outer periphery respectively of one each of the belts being cured as it passes over the drum. The pivot arms 44 and 45 are secured in the band tensioning position with the pulleys 42 and 43, respectively, closely adjacent the drum 20, by a locking bar 57 which is illustrated in FIGS. 1a, 3 and 6. The locking bar 57 is pivotably mounted on a U-shaped bracket 58 attached to each of the pivot arms 44 near the end portions thereof. The upper portion of the front plate 11 has a slot 11a formed therein which slot receives one end of the locking bar 57 therein when the arms 44 are in the position for tensioning the bands 40 against the belts to be cured. A locking block 59 is attached to the face of the vertical plate 10a and is contacted by the remaining end of the locking bar 57 when the bar is engaged in the slot 11a in the front plate.

Referring specifically to FIG. 6, the locking bar is shown in solid outline in the locked position and in phantom outline in the unlocked position. When the pivot arms 44 and 55 are locked into position with the idler pulleys 42 and 43 closely adjacent drum 20, the predetermined pressure is then applied to a manifold, similar to the manifold 35 for tensioning the belts, and, hence, to each one of a group of the power cylinders provided for moving the tension idler pulleys 41 against the inner periphery of the endless bands. Thus, each of the bands is drawn taut over the pulleys with the outer periphery of each of the bands pressing against one of the belts on the drum. While the predetermined fluid pressure is applied to the manifold, the bands are maintained individually to the desired uniform level of tension. As the drum 20 is rotated by sprocket drive S, the frictional contact of each of the endless bands 40 against the outer periphery of respectively each of the belts, causes each band to orbit over the pulleys 42 and 43 and the tension idler pulleys 41 so that the endless bands 40 continuously contact and exert pressure upon the outer surfaces of the belts as they pass over the drum 20.

The sizes of the hydraulic cylinders for the tension idler pulleys 41 and the speed of the rotation of the drum 20 are determined by the requirements for the vulcanization of any particular type of belt. By way of example, but without limitation thereto, it has been found that, when simultaneously curing four V-belts of the type known in the art and trade as "C" section No. 120 size, it has been found that hydraulic cylinders and pulley spacing chosen to give 80 pounds per square inch surface pressure of the bands against the belts has proven quite satisfactory. If desired, more or less than four belts may be cured simultaneously by providing the appropriate number of bands, pulleys and drum grooves. It will be also understood that the arrangement of the pulleys and the tension in the belts and endless bands may be varied from those shown and specifically described. Although the apparatus is illustrated, for convenience, with the belts and bands wrapping around the drum an arc of 180°, the pulleys and associated structure may be such that a drum wrap of more or less than 180° is provided.

Referring now to FIG. 3, an insulated shoe 60 is illustrated which has been provided in close proximity but not contacting the radially outer surface of the endless bands 40 as they are tensioned against the drum 20. The shoe serves to reduce undesirable cooling of the bands during the curing and if desirable, external means (not illustrated) may be provided for heating the shoe. In the preferred practice of the invention, the insulator shoe is divided into two segments, 60a and 60b, with one segment 60a rigidly attached to pivot arm 55 and the other portion pivotally attached at one end to the arms 44. The insulator shoe segments are moved into a position so as to not contact the endless bands but reside in close proximity thereto when the arms are locked in the tensioning position, as shown in solid outline in FIG. 3, and pivot away from the bands when the arms are in the relaxed position, as illustrated in phantom outline in FIG. 3. If it is desired to provide contact and contact pressure for the insulating shoe segments against the endless bands 40, any convenient force actuator device as, for example, mechanical clamps or power cylinders, may be employed to press the insulator shoes tightly against the bands. The insulator shoes are preferably made of a material to permit the orbiting bands 40 to slide easily under the shoe segments.

A telescoping guard 61 is provided for the bands 40 in the presently preferred apparatus, with one end pivotally attached to each of the arms 44 closely adjacent the bifurcated portion 44a thereon. The guard has the other end pivotally attached to the vertical plate 10a of base 10 such that the guard is extended when the arms are locked in the tension position and is telescoped longitudinally when arms are in the open position as illustrated in FIG. 3, respectively, by solid and phantom lines.

In operation, it has been found desirable to chill the terminal zone of the belt curing arc of the drum in order to cool the portion of the belts being cured just prior to leaving the region in which they are subjected to mechanical pressure by the bands 40.

Figure 7:
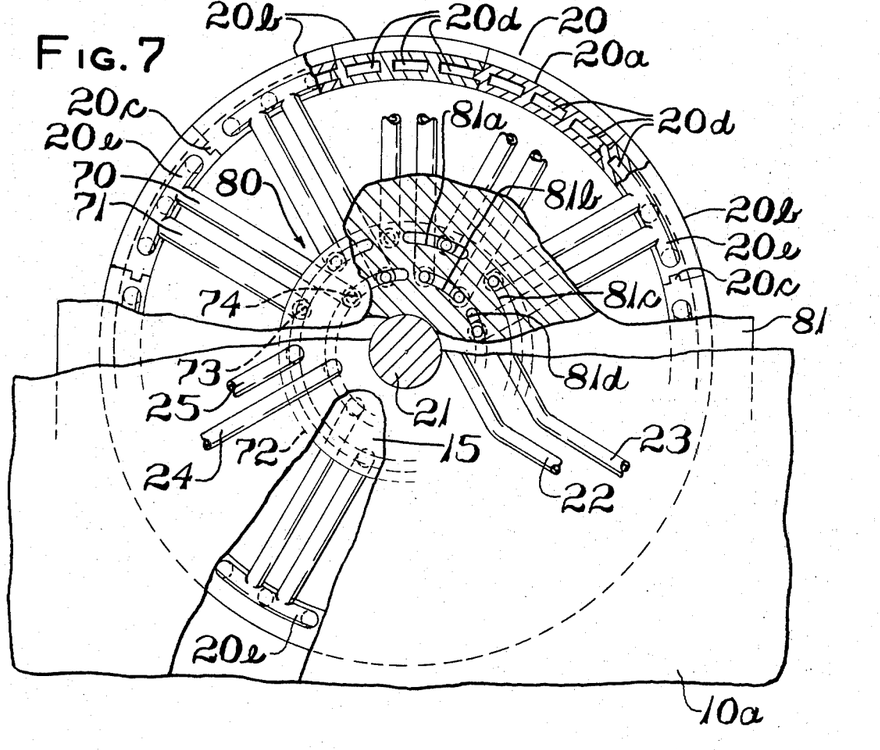
FIG. 7 is an enlarged view of a portion of a section view taken along section indicating lines 7—7 of FIG. 2 showing the details of the distributor valving mechanism for heating and zone cooling the drum.

Referring now specifically to FIG. 7, the drum 20 is shown broken away to expose the plurality of arcuate segments 20b provided on the periphery thereof with the respective circumferentially adjacent edges of the segments 20 having complementary interfitting portions 20c such that the segments 20b form a continuous ring about the periphery of the drum. Each of the arcuate segments 20b has at least one, and preferably a plurality, of fluid-receiving chambers 20d extending axially therethrough with the individual chambers 20d closed at one end with the remaining end communicating with a common manifold 20e extending peripherally along the axial edge of each arcuate segment 20b. If desired, each of the manifolds 20e may be formed integrally with the respective adjacent segment 20b. Each manifold has at least one and preferably two transfer tubes 70 and 71 communicating therewith for the transfer of fluid thereto.

The drum has a central rotor plate 72 provided on the axis thereof, which plate is perpendicular to the axis of rotation of the drum and is mounted thereon so as to rotate with the drum by separate mounting means (not shown). The rotor plate 72 has a plurality of pairs of transfer port holes 73 and 74 formed therein such that one hole of each pair is radially inward of the other hole.

Referring now to FIGS. 1 and 7, the preferred means of heating and zone chilling the drum is illustrated as including a rotary fluid valve 80 provided on the end of the drum axis for providing cooling fluid to a portion of the drum 20 during its rotation and heating fluid to the remainder of the drum. A stationary valve plate 81 is mounted closely adjacent the end of the drum on the face of vertical plate 10a with the plane of the plate perpendicular to the drum axis, the plate being disposed concentrically about the drum shaft 21 and attached to the vertical plate 10a. The stationary plate 81 has at least two pairs of concentric arcuate blind slots formed on the inner face thereof with each having a port (not shown) communicating with the outer face of the plate. Pairs of fluid supply hoses 22, 23 and 24, 25, respectively, are connected one to each port for supplying cooling fluid to and from one pair of slots for cooling and heating fluid to the other pair of slots. Each pair of slots is formed so as to subtend the same central angle of drum rotation with the pairs spaced and staggered peripherally so as to provide the desired porting. The arc subtended by one pair of slots 81a and 81b is chosen to provide fluid transfer for the desired amount of drum rotation for cooling as determined by the requirements for curing a particular type of belt and extend peripherally for an arc of generally 15°. The arc subtended by the other pair of slots 81c and 81d extends continuously the remainder of the drum periphery for transfer of heating fluid to the majority of the drum periphery. In the presently preferred practice, the plate 81 is oriented such that one pair of slots 81a and 81b are positioned so as to transfer fluid to the portion of the drum rotating through the terminal 15° of contact with the orbiting bands 40.

Thus, as the drum rotates, each pair of port holes 73 and 74 pass respectively so as to communicate with respectively the pair of slots 81a, 81b and 81c, 81d, thereby permitting fluid transfer to the respective portions of the drum periphery. The radially inward ends of each pair of transfer tubes 70, 71 from each of the manifolds 20e are respectively connected to respectively one of each pair of port holes 73 and 74. In operation, as the drum rotates, cooling fluid under pressure is supplied at either of the supply hoses 22, 23 and upon alignment of ports 73, 74 with pair of slots 81a, 81b, cooling fluid is transferred to respectively one of the manifolds 20e and returns through the other transfer tube, arcuate slots and supply hose, respectively.

Similarly, alignment of any of the transfer tubes with slots 81c, 81d will permit transfer of heating fluid, supplied to hoses 24, 25 to the respective manifolds 20e. It will be understood that suitable rotary face sealing ring seals (not shown) rare provided between adjacent faces of stationary plate 81 and rotor plate 72 to form fluid pressure tight transfer chambers between the plates 81 and 72. In the presently preferred practice, seal rings of materials such as Teflon and nylon are used, but other suitable materials may be used. Thus, as the drum rotates, cooling fluid is supplied continuously to a desired portion of the drum coincident with a portion of the drum periphery at a fixed position with respect to the frame of the apparatus. As mentioned above, this latter rotary distributor valve arrangement permits heating the majority of the periphery of the drum and simultaneously continuous zone chilling of a smaller arcuate segment of the drum for cooling of a portion of the belt being cured just before leaving the region of the drum where it is subjected to mechanical pressure by the orbiting bands 40.

For the curing operation, the arms 55 and 44 are released to the opened position such that the bands 40 are not in contact with the drum. The uncured belts B are then installed over the drum 20, stationary idler pulleys P and belt tension idler pulleys 32. The arms 44 and 55 are then moved to the closed position by turning crank 53 to bring the bands 40 into contact with the belts over the drum, locking arm 57 is engaged and toggle T is closed to lock the belt tensioning mechanism. Fluid pressure is then applied to the respective manifolds respectively connected to power cylinders for moving the belt and band tension idlers 41 and 32 respectively for tensioning the belts B and bands 40. Heating fluid is introduced through tubes 24 and 25 to heat the drum. The motor drive M is activated when the drum is at the desired temperature and the drum is rotated continuously and cooling fluid is circulated through tubes 22 and 23 for zone chilling the terminal zone of the belt curing on the drum. When the entire length of the belt has been passed under the bands 40, the fluid pressure is released from the power cylinders actuating the belt and band tension idler pulleys 41 and 32 respectively thereby releasing the tension on the belts and the bands. Toggle T is then released and crank 53 rotated to move the band supporting arms 44 and 55 to the open position thus releasing the cured belts for removal from the drum.

The invention thus provides an apparatus for curing simultaneously a plurality of endless elastomeric belts while the belts are orbiting over a rotating drum. The belts are individually tensioned to a predetermined common tension by individually movable, or articulating, tension idler pulleys. A plurality of endless bands of inextensible material are provided with each band respectively tensioned to contact and orbit against the belts as they pass over the curing drum. The bands are also tensioned by individually movable tension idler pulleys similar to those used for tensioning the belts. Although a common fluid pressure is provided to the power cylinders for tensioning the bands and the belts, it is noted that the bands and belts may be tensioned individually by separate fluid pressure sources rather than a common manifold, or by separate mechanical force actuators.

Other modifications and adaptations of the invention will be apparent to those having ordinary skill in the art and the invention limited only by the spirit and scope of the following claims.

We claim:

1. An apparatus for vulcanizing a plurality of endless elastomeric belts comprising:
   a. heated mold means including a member having a plurality of recesses adapted to simultaneously receive portions of each of said belts respectively in one of said recesses and a plurality of presser means each having a portion thereof supported for releasable contact with one of said belts while same are in said recesses;
   b. means operatively connected to said presser means in a manner causing the latter to exert a predetermined common force upon the portion of each belt contacted thereby;
   c. a plurality of means for individually tensioning each of said belts to a common tension while in contact with said mold means; and
   d. means for advancing successive portions of each of said belts to and from contact with said mold means.

2. The apparatus defined in claim 1 wherein said belt tensioning means includes:
   a. a plurality of pulleys each having the outer periphery thereof rotatable about its axis adapted to contact the inner periphery of one of the belts to be vulcanized,
   b. an individual support for the rotational axis of each pulley mounted for movement perpendicularly of the axis, and
   c. a plurality of actuators each including a movable operative portion connected respectively to each of the said movable supports to effect individual movement thereof.

3. The apparatus defined in claim 2 wherein each of said actuators is fluid-pressure operated and is connected to a common source of fluid pressure.

4. The apparatus defined in claim 2 wherein
   a. each of said movable supports comprises a slidably mounted plate portion, and
   b. each of said pulleys comprises an annular peripheral ring rotatably mounted on said slidable plate with a belt-receiving groove on the outer periphery of the ring.

5. The apparatus defined in claim 4 wherein said actuators each comprise fluid pressure actuator having a movable portion and each of the said movable portions is connected respectively to one of the said slidable plates.

6. The apparatus defined in claim 5 wherein each of said fluid pressure actuators is connected to a common source of fluid pressure.

7. The apparatus defined in claim 1 wherein:
   said means for exerting a force on said presser means includes individual portions thereon, each operatively connected respectively to one of said presser means.

8. The apparatus as defined in claim 7 wherein said presser means are individually movable and said means for exerting a force on each of said presser means includes separately operative means for each of said presser means operative for adjustment of the pressure exerted upon the belt contacted thereby.

9. The apparatus defined in claim 7 wherein:
   a. said member of said mold means includes a rotatable drum the periphery of which has a plurality of circumferential grooves constituting said recesses, and
   b. each of said presser means is an endless bands of substantially inextensible material each mounted to orbit in a path a portion of which is arcuate and concentric with a part of the periphery of said drum with each of said bands contacting and exerting pressure on one of the belts being vulcanized while the latter is in contact with said drum.

10. The apparatus as defined in claim 9 further comprising means to move each of said bands simultaneously to and from belt-contacting positions.

11. The apparatus defined in claim 9 wherein said drum includes means for sequentially heating and cooling portions of said drum during a predetermined arc of drum rotation.

12. The apparatus defined in claim 11 wherein:
   a. said drum includes a plurality of arcuate fluid-receiving chambers formed therein spaced adjacent the periphery thereof with a port communicating with each of said chambers;
   b. said heating and cooling means includes fluid source means sequentially connectable to each of said ports for selectively circulating heating and cooling fluid through each of said chambers.

13. The apparatus defined in claim 12 wherein said fluid source means comprises distribution valve means including a non-rotatable portion mounted concentric with the axis of said drum.

14. The apparatus defined in claim 12 wherein said drum includes: a plurality of arcuately extending segments having the circumferentially adjacent edges thereof interconnected with each segment having at least one of said fluid receiving chambers formed therein.

15. The apparatus defined in claim 14 wherein each of said segments has a plurality of individual fluid chambers formed therein with a common manifold provided thereon communicating with each of said chambers and with one of said port means provided in each of said manifolds.

16. The apparatus as defined in claim 9 wherein the said means connected to said presser means comprises:
   a. plurality of pulleys each having the outer periphery thereof in contact with the interior of one of said bands;
   b. an individual support for the rotational axis of each pulley movable perpendicular to the axis thereof; and
   c. means to individually move each pulley support.

17. The apparatus defined in claim 16 wherein said means for individually moving said pulley supports comprises a separate fluid pressure actuator for each said pulley support with each actuator including a movable portion connected respectively to one each to the said movable supports.

18. The apparatus defined in claim 17 wherein each of the said fluid pressure actuators is connected to a common source of fluid pressure.

19. The apparatus defined in claim 16 wherein said means to move said bands simultaneously includes:
   a. two sets of band-supporting pulleys;

b. means mounting said sets of pulleys for movement to and from locations adjacent said drum with one set of pulleys arcuately spaced about the drum from the other so that when the said sets of pulleys are adjacent the drum portions of the bands are in pressure-applying contact with the belts on said drum; and
c. means operably connected to each of said sets of pulleys for simultaneously moving the said sets toward or away from said drum.

20. The apparatus as defined in claim 16 wherein
a. each of the said pulley supports comprises a slidably mounted plate portion; and
b. each of said pulleys comprises an annular peripheral ring rotatably mounted on said slidable plate with a band-receiving groove on the outer periphery of the ring.

21. The apparatus defined in claim 9 further comprising power means for rotating said drum.

* * * * *

UNITED STATES PATENT OFFICE
CERTIFICATE OF CORRECTION

Patent No. 3,700,365  Dated October 24, 1972

Inventor(s) Alvin W. Spicer and Anselm Talalay

It is certified that error appears in the above-identified patent and that said Letters Patent are hereby corrected as shown below:

Column 1, lines 9 and 10, delete "a drum." and insert ----for---. Column 10, line 5, "rare" should read ---are---.

Signed and sealed this 6th day of March 1973.

(SEAL)
Attest:

EDWARD M. FLETCHER, JR.  
Attesting Officer

ROBERT GOTTSCHALK  
Commissioner of Patents